June 30, 1942.   C. BAUGHN   2,288,429
HEADLIGHT WIPER
Filed Aug. 1, 1941
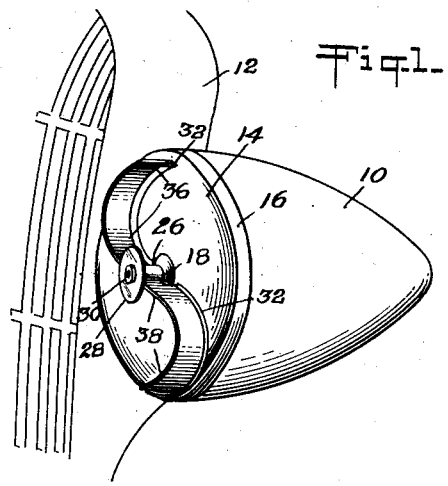
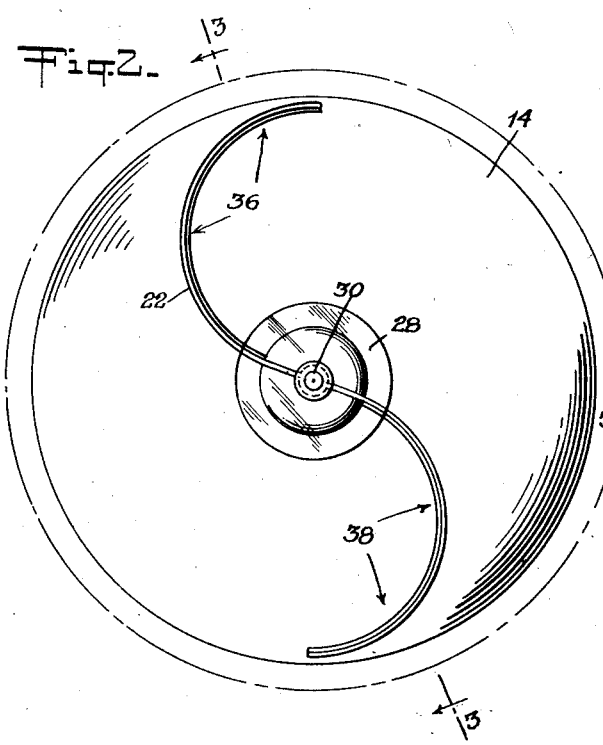
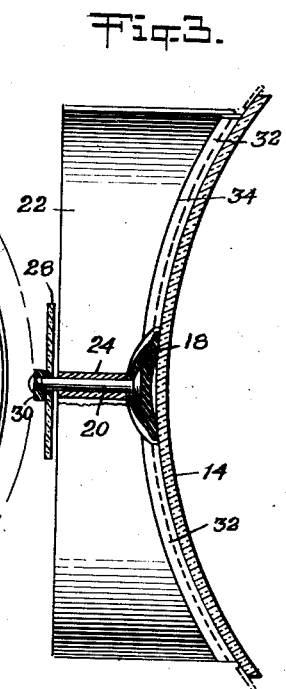
WITNESSES
INVENTOR
Charles Baughn
BY
ATTORNEYS Patented June 30, 1942

2,288,429

UNITED STATES PATENT OFFICE 2,288,429

HEADLIGHT WIPER

Charles Baughn, Visalia, Calif.

Application August 1, 1941, Serial No. 405,043

3 Claims. (Cl. 15—250)

This invention relates to a wiper, and more particularly to the type of wiper which is adapted to be attached to forwardly placed glass surfaces of automobiles, such as headlight lenses and certain types of windshields.

An object of this invention is to provide a wiper which will be automatically operated by air currents when the vehicle is in motion.

A further object is to provide a wiper which will clean off moisture, dirt or other particles, such as insects, dust or snow, which gather on the glass fronts of automobiles during their operation.

A further object is to provide a device of the class described, which will be simple in operation, economical in construction, and readily adapted to standard equipment.

A further object is to provide a wiper which will take advantage of the curved or slanted structure of modern headlights and windshields.

With these and other objects in view, which will become apparent as the description proceeds, reference is had to the accompanying drawing, in which—

Fig. 1 shows a perspective view of my wiper applied to a headlight;

Fig. 2 is a front view thereof;

Fig. 3 is a cross-sectional view, taken on the line 3—3 of Fig. 2.

While I have shown my wiper applied to a headlight, it will be appreciated that it may be applied equally well, with slight modifications, to windshields where the windshields are curved or at an angle to the axis of movement of the vehicle.

In the accompanying drawing 10 indicates the conventional headlight positioned on the front 12 of the conventional car. The normal headlight is provided with a convex lens 14 held in place by the rim 16.

While my device may be permanently attached to the lens by drilling therethrough, the most adaptable form shown in the drawing includes a suction cup 18 adapted to be positioned on the face of the headlight. The suction cup 18 supports a shaft 20 on which is balanced a blade 22 by means of a bore 24 through an enlarged portion 26. A transparent pressure disk 28 is provided to position the blade and a lug or washer 30 is provided to secure the blade on the shaft. A conventional wiping means, such as the rubber strip 32, may be applied to the inner arcuate surface 34 of the blade 22 to form a contact surface between the blade 22 and the glass lens 14.

As the car moves, air pressure will be built up and press against the blade 22 in the direction of the arrows 36 and 38 causing the blade to rotate and the wiping element 32 to clean the lens 14. These air currents are built up and directed against the blade 22 by reason of the angle of the lens or of the windshield where the windshield is set at an angle other than 90 degrees to the axis of movement of the vehicle. The blade will start rotating when the vehicle reaches a speed of 10 or 15 miles an hour, and will increase in speed and friction as the car speed increases until the air pressure against the transparent disk 28 is sufficient to cause the disk 28 to press the blade strongly against the lens to exert braking action and to hold the rotation of the disk to a reasonable speed.

It will be appreciated that snow, moisture, dirt or insects will be kept from the lens, and that the light will therefore be much more efficient. It will also be appreciated that the wiper will make the light more efficient in snowy and foggy weather, and will therefore tend to cut down the glare by cutting and passing through the beam of light.

I claim:

1. A wiper comprising a substantially S-shaped blade having an arcuate inner edge, glass wiping means at said inner edge, a bore in said blade, a shaft in said bore, and suction means on the end of said shaft for positioning said wiper on a glass surface.

2. A wiper for glass surfaces, including means for positioning said wiper on glass, a shaft, an S-shaped blade mounted for rotation on said shaft, and a disk mounted on said shaft adapted to frictionally engage said blade to force said blade against said glass to limit the speed of rotation thereof.

3. A wiper for automobile headlights, comprising a substantially S-shaped blade mounted for rotation on a shaft, the inner edge of said blade being of a contour to conform with the contour of said headlights, means on said shaft to position said wiper on said headlights, and additional means on said shaft to prevent excessive speed in the rotation of said wiper said means comprising a disk mounted on said shaft adapted to force said blade into frictional engagement with said headlights.

CHARLES BAUGHN.